(12) United States Patent
Zopf (10) Patent No.: US 10,784,989 B2
(45) Date of Patent: Sep. 22, 2020

(54) BIT ERROR CORRECTION FOR WIRELESS RETRANSMISSION COMMUNICATIONS SYSTEMS

(71) Applicant: Cypress Semiconductor Corporation, San Jose, CA (US)

(72) Inventor: Robert Zopf, Rancho Santa Margarita, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 16/131,286

(22) Filed: Sep. 14, 2018

(65) Prior Publication Data
US 2019/0288792 A1    Sep. 19, 2019

Related U.S. Application Data

(60) Provisional application No. 62/689,564, filed on Jun. 25, 2018, provisional application No. 62/643,052, filed on Mar. 14, 2018.

(51) Int. Cl.
| | |
|---|---|
| *H03M 13/00* | (2006.01) |
| *H04L 1/18* | (2006.01) |
| *H04L 1/00* | (2006.01) |
| *H04L 1/08* | (2006.01) |

(52) U.S. Cl.
CPC .......... *H04L 1/0045* (2013.01); *H04L 1/0061* (2013.01); *H04L 1/08* (2013.01)

(58) Field of Classification Search
CPC ........ H04L 1/0045; H04L 1/0061; H04L 1/08
See application file for complete search history.

(56) References Cited

U.S. PATENT DOCUMENTS

| | | |
|---|---|---|
| 6,223,047 B1 | 4/2001 | Ericsson |
| 6,523,148 B1 | 2/2003 | Junghans |
| 8,255,754 B2 | 8/2012 | Tsfati et al. |
| 8,392,810 B2 | 3/2013 | Linsky et al. |
| 8,700,970 B2 | 4/2014 | Steiner et al. |
| 8,850,296 B2 | 9/2014 | Weingarten et al. |

(Continued)

FOREIGN PATENT DOCUMENTS

| | | |
|---|---|---|
| CN | 1257627 A | 6/2000 |
| RU | 2494445 C1 | 9/2013 |
| WO | 2008069465 A1 | 6/2008 |

OTHER PUBLICATIONS

International Search Report for International Application No. PCT/US19/021863 dated May 28, 2019; 2 pages.

(Continued)

*Primary Examiner* — Samir W Rizk (57) ABSTRACT

A system includes a transmitter configured to transmit an original packet. The system also includes a receiver comprising a processing device. The processing device is configured to receive a corrupted Bluetooth® packet of the original packet and at least one retransmitted packet of the original packet. The processing device is also configured to generate an accumulated packet based on the corrupted packet and the at least one retransmitted packet, and generate a decision packet for the original packet based on the accumulated packet. The processing device is further configured to verify the decision packet to determine whether the decision packet is correct.

20 Claims, 5 Drawing Sheets

(56) References Cited

U.S. PATENT DOCUMENTS

| | | | |
|---|---|---|---|
| 8,850,297 | B1 | 9/2014 | Steiner et al. |
| 9,124,298 | B2 | 9/2015 | Zopf |
| 9,831,984 | B1 | 11/2017 | Liu et al. |
| 2003/0217319 | A1* | 11/2003 | Tripathi ............ H03M 13/3738 714/751 |
| 2005/0276224 | A1* | 12/2005 | Jiang .................... H04L 1/1812 370/236 |
| 2008/0059868 | A1 | 3/2008 | Cai et al. |
| 2011/0019599 | A1* | 1/2011 | Wood ........................ G01S 3/04 370/310 |
| 2012/0002603 | A1* | 1/2012 | Lohr ..................... H04L 1/0006 370/328 |
| 2013/0329644 | A1 | 12/2013 | Tong et al. |
| 2014/0032990 | A1 | 1/2014 | Goetffert |
| 2014/0059407 | A1 | 2/2014 | Zopf et al. |
| 2014/0161031 | A1 | 6/2014 | Grunert et al. |
| 2019/0104423 | A1* | 4/2019 | Hariharan ................ H04R 3/12 |

OTHER PUBLICATIONS

International Written Opinion for International Application No. PCT/US19/021863 dated May 28, 2019; 10 pages.

Wu and Li, "Magitiy 9Decoded Automatic Repeat Request Error Control Schemes," Department of Electrical Engineering, 50.2.1; 9 pages.

* cited by examiner

FIG. 5

BIT ERROR CORRECTION FOR WIRELESS RETRANSMISSION COMMUNICATIONS SYSTEMS

CROSS-REFERENCE TO RELATED APPLICATIONS

This application claims the benefit of U.S. Provisional Application No. 62/689,564 filed on Jun. 25, 2018, and claims the benefit of U.S. Provisional Application No. 62/643,052 filed on Mar. 14, 2018. The contents of each of the aforementioned applications are hereby incorporated by reference in their entireties.

TECHNICAL FIELD

Aspects of the present disclosure generally relate to wireless communications systems, and more particularly, to bit error correction for wireless retransmission communications systems.

BACKGROUND

Many wireless communications systems use retransmissions to achieve a reliable communication link between a transmitter and a receiver of the wireless communications systems. The number of retransmissions may have a negative impact on delay and power requirements of wireless communications between the transmitter and the receiver. For example, real-time or two-way audio or video wireless links are delay sensitive and may limit the number of retransmissions. In another example, wireless streaming applications are less delay sensitive and may incorporate large playout buffers to enable a larger number of retransmissions.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Bit errors can indicate the quality of communications of a wireless communication link between a transmitter and a receiver in a wireless network. One type of bit errors is random bit errors. Random bit errors may be caused by certain persistent channel impairment (e.g., weak signals due to physical barrier or distance) and may include bit errors approximately evenly distributed across transmitted packets. One solution to combat random bit errors is to retransmit an original transmitted packet one or more times until an error-free packet is received. That is, an error-free packet can be received at the receiver after a number of retransmissions of the original transmitted packet by the transmitter.

Some solutions of retransmission simply discard corrupted received packets and solely rely on an error-free reception of a subsequent retransmission. For example, even a single bit error in a received packet may cause failure of cyclic redundancy check (CRC) at the receiver and a retransmission of the packet. Thus, these solutions may require a large number of retransmissions to overcome random bit errors. For example, with a 610-byte packet, a large number (e.g., more than 10) of retransmissions may be required to achieve a required or desired bit error rate (BER) of the wireless communication link, such as 0.01%. The large number of retransmissions may reduce the transmission rate and consume more power both at the transmitter and the receiver. Thus, it may be desired to use a small number (e.g., less than 5) of retransmissions to achieve the required or desired BER.

The examples, implementations, and embodiments described herein can use a small number (e.g., less than 5) of retransmissions to achieve the required or desired BER and provide power and delay savings and low complexity.

Figure 1:
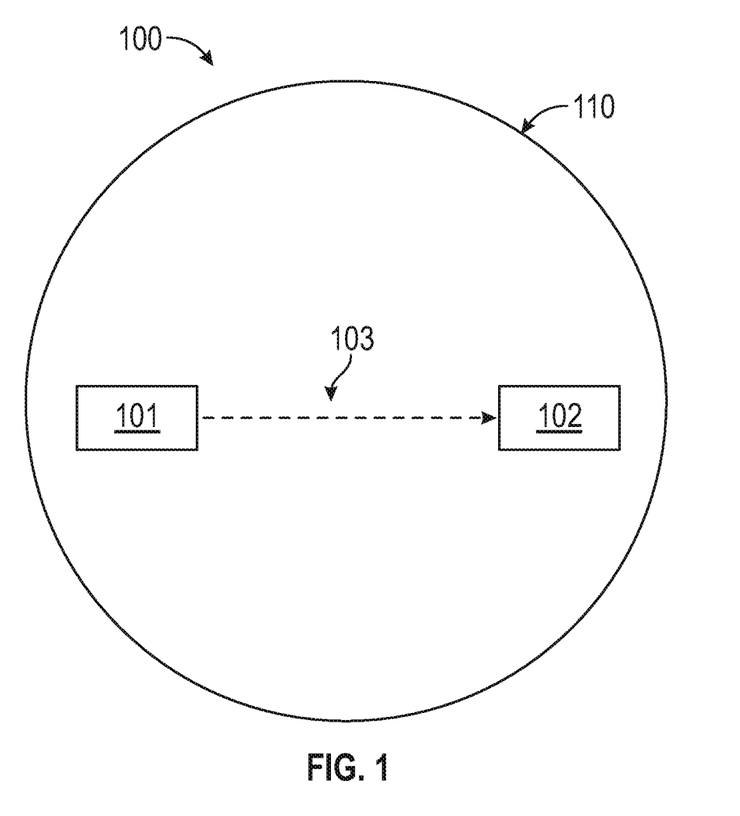
FIG. 1 illustrates an example wireless network architecture, in accordance with some embodiments of the present disclosure.

FIG. 1 illustrates an example network architecture 100, in accordance with some embodiments of the present disclosure. As shown in FIG. 1, the network architecture 100 may include a transmitter 101 and a receiver 102. The transmitter 101 can transmit wireless radio-frequency signals carrying data packets (or data messages, frames, etc.) to the receiver 102, as indicated by arrow 103. The receiver 102 can receive the transmitted signals to extract the data packets. If the receiver 102 detects that a transmitted data packet is correctly received without bit errors, the receiver 102 can send a notification such as an acknowledgement (ACK) to the transmitter 101. The transmitter 101 will not retransmit the correctly received data packet. On the other hand, if the receiver 102 detects that a received data packet is a corrupted data packet including one or more bit errors, the receiver 102 can send a notification such as a negative acknowledgement (NACK) to the transmitter 101. The transmitter 101 will retransmit the data packet to the receiver 102. The circle 110 illustrated in FIG. 1 may represent the range of the radio-frequency signals transmitted by the transmitter 101. Receivers such as the receiver 102 that are located within the circle 110 may be able to receive radio-frequency signals transmitted by the transmitter 101.

In one embodiment, the network architecture 100 may be a Bluetooth® network. A Bluetooth® network may be a wireless network that includes network devices which communicate using radio frequencies, protocols, standards, data formats, etc., that have been defined by the Bluetooth® Special Interest Group (Bluetooth® SIG). In this embodiment, the transmitter 101 can be a Bluetooth® transmitter and the receiver 102 can be a Bluetooth® receiver. The data packets transmitted from the transmitter 101 to the receiver 102 can be Bluetooth® packets. In some embodiments, the Bluetooth® network (e.g., the devices within the Bluetooth® network) may use the Bluetooth® Low Energy standard.

In other embodiments, the network architecture 100 can be other wireless networks including but not limited to cellular networks (e.g., Long-Term Evolution (LTE) networks), wireless local area networks (WLANs), wireless sensor networks and satellite communication networks. The network architecture 100 may also include other nodes, components and/or devices not shown in FIG. 1.

In order to use a small number (e.g., less than 5) of retransmissions to achieve the required or desired BER and provide significant power and delay savings and low complexity, in some examples, implementations, and embodiments described herein, the receiver 102 may not discard corrupted received packets because multiple corrupted received packets of the same transmitted packet may provide useful information to determine the locations of bit errors in the corrupted received packets. The receiver 102 may combine multiple corrupted received packets of the same transmitted packet to generate one or more accumulated packets including soft bits. The receiver 102 can use the one or more accumulated packets to generate a decision packet, which can be used as a guess of the original transmitted packet. The receiver 102 can verify whether the decision packet is a correctly received packet without bit errors. If the decision packet includes one or more bit errors, the receiver 102 can correct the bit errors using CRC error correction.

Examples, implementations, and embodiments described herein are primarily described in the context of a Bluetooth® network. That is, the network architecture 100 is a Bluetooth® network including a system with a Bluetooth® transmitter 101 and a Bluetooth® receiver 102. However, it should be understood that the network architecture 100 can be other wireless networks including but not limited to cellular networks (e.g., Long-Term Evolution (LTE) networks), wireless local area networks (WLANs), wireless sensor networks and satellite communication networks, as mentioned above.

Figure 2:
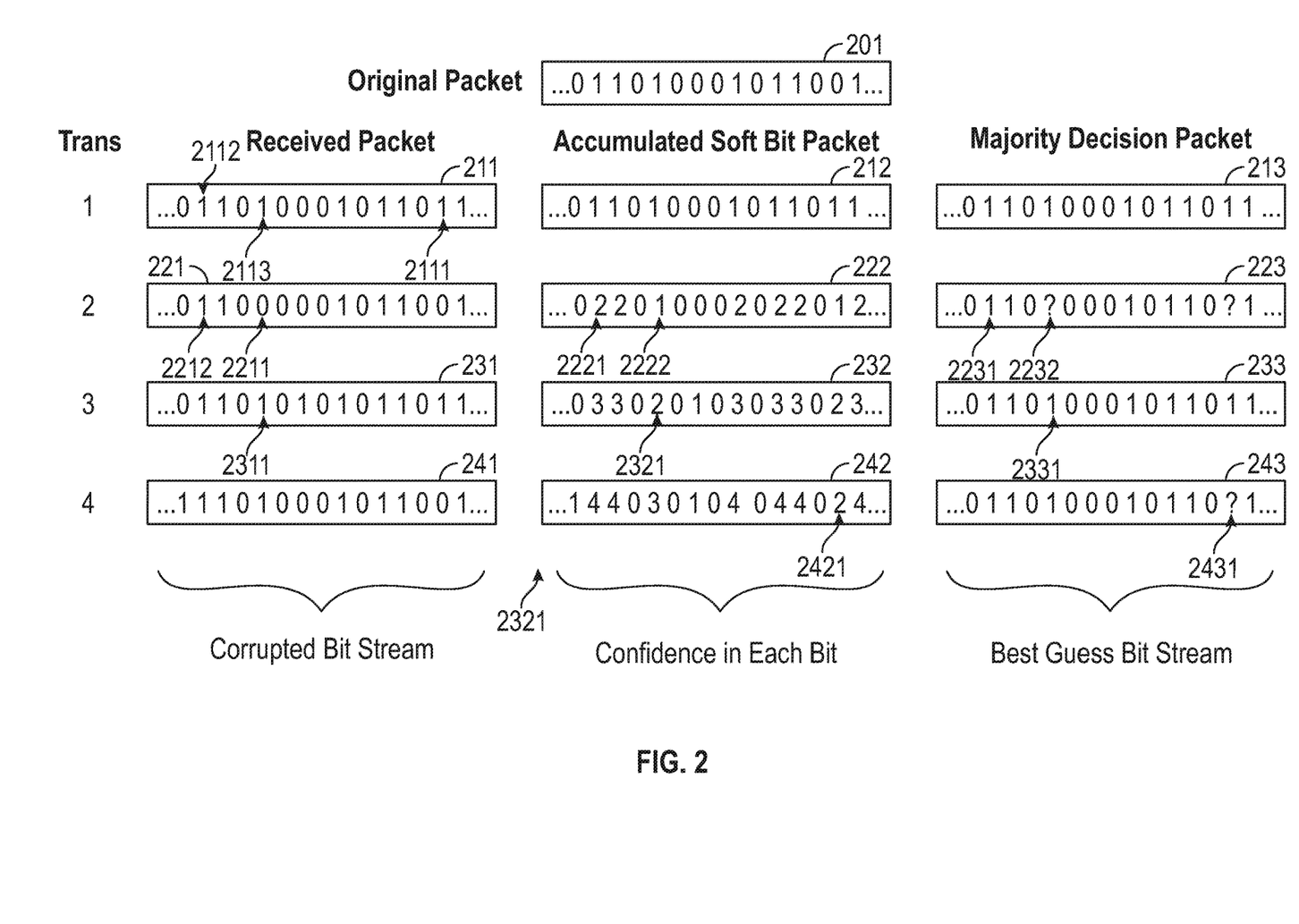
FIG. 2 illustrates example generations of accumulated packets and decision packets, in accordance with some embodiments of the present disclosure.

FIG. 2 illustrates exemplary accumulated packets and decision packets, in accordance with some embodiments of the present disclosure. The transmitter 101 can transmit radio frequency signals carrying an original Bluetooth® packet 201 to the receiver 102. The receiver 102 may receive a Bluetooth® packet 211 and perform a CRC to determine whether the packet 211 is a correctly received packet of the original packet 201 without bit errors. In one embodiment, the packet 211 may be a corrupted packet including one or more bit errors such as a bit error 2111. Thus, CRC at the receive 102 will fail. The receiver 102 can generate an accumulated packet 212 and a majority decision packet (MDP) 213 based on the packet 211. When the receiver 102 only receives the packet 211, the accumulated packet 212 and the MDP 213 may be the same as the received packet 211.

In one embodiment, because the packet 211 is a corrupted Bluetooth® packet of the original packet 201, the receiver 102 can request the transmitter 101 to retransmit a packet of the original packet 201. The receiver 102 may receive a retransmitted packet 221 of the original packet 201. Similarly as described above, the receiver 102 can perform a CRC to determine whether the received retransmitted packet 221 is correct. The received retransmitted packet 221 may be a corrupted packet including one or more bit errors such as a bit error 2211. The receiver 102 can generate an accumulated packet 222 including soft bits based on the packet 211 and the retransmitted packet 221.

In one embodiment, the receiver 102 can generate the accumulated packet 222 by performing bitwise decimal addition on the corrupted packet 211 and the received retransmitted packet 221 to generate soft bits in the accumulated packet 222. For example, as shown in FIG. 2, the packet 211 may include a bit stream "0 1 1 0 1 0 0 0 1 0 1 1 0 1 1," and at the corresponding bit locations, the retransmitted packet 221 may include a bit stream "0 1 1 0 0 0 0 0 1 0 1 1 0 0 1." The receiver 102 can add the bit in the packet 211 and the corresponding bit in the retransmitted packet 221 to generate the accumulated packet 222 to include a soft bit stream "0 2 2 0 1 0 0 0 2 0 2 2 0 1 2," as shown in FIG. 2. In this example, the bit 2112 in the packet 221 is 1 and the bit 2212 at the corresponding bit location in the retransmitted packet 221 is also 1, thus, the soft bit 2221 at the corresponding bit location in the accumulated packet 222 has a value of 2 (i.e., 1+1). In other embodiments, the receiver 102 can compare the corrupted packet 211 and the received retransmitted packet 221 to identify bit locations with different bit values. The identified bit locations may indicate possible bit errors.

In one embodiment, the receiver 102 can generate a MDP 223 based on the accumulated packet 222. The MDP 223 may be used as a guess of the original Bluetooth® packet 201. Each of the soft bits in the accumulated packet 222 may indicate a confidence level of a corresponding bit in the MDP 223. For example, in the first transmission, bit 2112 is 1 and in the second transmission (the first retransmission), bit 2212 at that bit location is also 1. Thus, it has a higher probability that the correct bit at that bit location is 1 instead of 0 because in two transmissions (one original transmission and one retransmission) the bit values at that bit location are the same. Therefore, the soft bit 2221 having a value of 2 may indicate that it has a higher confidence level that the correct bit at that bit location is 1. Accordingly, the receiver 102 can determine that, in the MDP 223, the bit 2231 (a guess of the correct bit) at that bit location is 1.

On the other hand, in the first transmission, bit 2113 is 1 and in the second transmission (the first retransmission), bit 2211 at that bit location is 0. Thus, at that bit location, it is not sure whether the correct bit at that location is 1 or 0 because in two transmissions the bit values at that bit location are different. Therefore, the soft bit 2222 having a value of 1 may indicate that the receiver 102 may be not sure whether the correct bit at that location is 1 or 0. Accordingly, the receiver 102 can determine that, in the MDP 223, the bit 2232 (a guess of the correct bit) at that bit location may be either 1 or 0, as indicated by "?". The receiver 102 can set the bit 2232 in the MDP 223 as either 1 or 0 as a guess of that bit.

In one embodiment, the receiver 102 can request more than one retransmissions of the original packet 201 to collect more useful information to determine the locations of bit errors in the received corrupted packets. For example, the receiver 102 can request a second retransmission of the original packet 201 and receive a retransmitted packet 231 which may include one or more bit errors. The receiver 102 can generate an accumulated packet 232 based on the packet 211, the received retransmitted packets 221 and 231. The receiver 102 can generate the accumulated packet 232 by performing bitwise decimal addition on the packet 211 and the received retransmitted packets 221 and 231, similarly as described above. For example, the bit 2311 in the packet 231 is 1, thus, the soft bit 2321 at the corresponding bit location in the accumulated packet 232 has a value of 2 (i.e., 1+0+1).

Also, the receiver 102 can generate a MDP 233 based on the accumulated packet 232, similarly as described above. The MDP 233 may be used as a guess of the original Bluetooth® packet 201. For example, the soft bit 2321 having a value of 2 may indicate that it has a higher confidence level that the correct bit at that bit location is 1. This is because in three transmissions (one original transmission and two retransmissions), two (i.e., bits 2113 and 2311) of the three bit values at that bit location are 1. Accordingly, the receiver 102 can determine that, in the MDP 233, the bit 2331 (a guess of the correct bit) at that bit location is 1.

Similarly as described above, the receiver 102 can request a third retransmission and receive a retransmitted packet 241 which may include one or more bit errors. The receiver 102 can generate an accumulated packet 242 based on the four received corrupted packets (211, 221, 231 and 241). Also, the receiver 102 can generate a MDP 243 based on the accumulated packet 242. The MDP 243 may be used as a guess of the original Bluetooth® packet 201.

In one embodiment, for a number of N total transmissions (1 original transmission+(N−1) retransmissions), when N is an even number, if a value of a soft bit in an accumulated packet is higher than $$\frac{N}{2},$$

the corresponding bit in the generated MDP is 1; if the value of the soft bit is equal to $$\frac{N}{2},$$

the corresponding bit in the generated MDP can be either 1 or 0; if the value of the soft bit is less than $$\frac{N}{2},$$

the corresponding bit in the generated MDP is 0. For example, as shown in FIG. 2, when there are 4 total transmissions of the original packet 201, if the soft bit in the accumulated packet 242 has a value of 3 or 4, the corresponding bit in the generated MDP is 1; if the soft bit in the accumulated packet 242 has a value of 2, the corresponding bit in the generated MDP can be either 1 or 0 as indicated by "?"; if the soft bit in the accumulated packet 242 has a value of 0 or 1, the corresponding bit in the generated MDP is 0. In another example, when N is an odd number, if a value of a soft bit in an accumulated packet is equal or higher than $$\frac{N+1}{2},$$

the corresponding bit in the generated MDP is 1; otherwise, the corresponding bit in the generated MDP is 0.

In one embodiment, the confidence level in each bit location as indicated by the soft bits in the accumulated packet can increase as the number of retransmissions increases. In one embodiment, the receiver 102 can determine whether to request another retransmission based on the confidence level in each bit location as indicated by the soft bits in an accumulated packet. For example, if a predetermined number (e.g., 10) of soft bits in the accumulated packet indicate that the correct bits may be either 1 or 0 (i.e., not sure), the receiver 102 can request more retransmissions. Otherwise, the receiver 102 can request a small number (e.g., 2-3) of retransmissions.

In one embodiment, for multiple retransmissions, the receiver 102 may use the MDP generated in the last retransmission as the best guess of the original packet. For example, the receiver 102 may use the MDP 243 in the last retransmission as the best guess of the original packet 201, because the accumulated packet 242 generated in the last retransmission includes most useful information to determine the locations of bit errors in the received corrupted packets 211, 221, 231 and 241. In one embodiment, after receiving a retransmitted packet, the receiver 102 may store the generated accumulated packet in a memory of the receiver 102 and use the MDP generated based on the last accumulated packet as the best guess of the original packet.

In one embodiment, if a received packet passes the CRC, the receiver 102 can determine that the received packet is correct and no retransmission is needed. For example, if the received packet 221 in the first retransmission is correct, the receiver 102 will not request the transmitter 101 to perform the second or the third retransmission. That is, the receiver 102 will not receive the retransmitted packet 231 or 241 if the received packet 221 is correct.

After generating the MDP as the best guess of the original packet, the receiver 102 needs to verify the MDP to determine whether the MDP is the correct original packet. For example, the receiver 102 may use the MDP 243 as the best guess of the original packet 201 and determine whether the MDP 243 is the same as the original packet 201. Direct computation of CRC to the MDP in firmware or CRC hardware of the receiver 102 may be too complex and not practical. In one embodiment, the receiver 102 can use the last received corrupted packet (LRCP) such as the packet 241 in FIG. 2 and a stored CRC syndrome table to determine whether the MDP 243 is correct.

Figure 3:
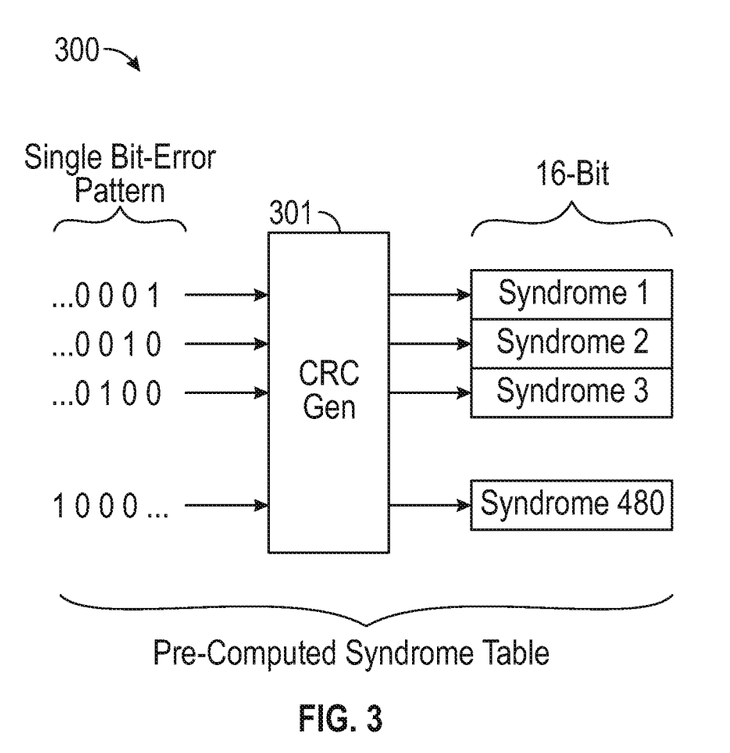
FIG. 3 illustrates an example CRC syndrome table, in accordance with some embodiments of the present disclosure.

FIG. 3 illustrates an example CRC syndrome table 300, in accordance with some embodiments of the present disclosure. The table 300 lists CRC syndromes for a bit stream including 480 bits (464 data bits and 16 CRC bits). For a bit stream of 480 bits, there can be 480 single bit error patterns, each including a single bit error at a respective bit location of the 480 bit locations. Each bit error pattern can be represented as a bit stream including 479 zeros and a bit 1 at the bit error location, as shown in FIG. 3. Each of the 480 bit error patterns is input to a CRC generator 301, which can generate a syndrome for each of the 480 bit error patterns, e.g., syndrome 1-syndrome 480. The CRC syndrome table 300 can be pre-computed and stored in a memory such as a read-only memory (ROM) or a slow access memory of the receiver 102. Alternatively, the CRC syndrome table 300 can be computed during the setup or initialization phase of the wireless link between the transmitter 101 and the receiver 102. The CRC syndrome table 300 can be pre-computed in firmware or in CRC hardware of the receiver 102. In other embodiments, the CRC syndrome table may include syndromes for a bit stream including a different number of bits.

As described above, for multiple retransmissions, the receiver 102 can use the last received corrupted packet (LRCP) among the multiple received corrupted packets such as the packet 242 and the CRC syndrome table such as the table 300 to determine whether the MDP 243 is correct. In one embodiment, the receiver 102 can compute bitwise XOR between the LRCP 241 and the MDP 243. The resulting bit stream may include zeros and one or more ones. The receiver 102 can extract one or more precomputed syndromes corresponding to the locations of the one or more ones. For example, if the location of a one in the resulting bit stream is the first bit in the resulting bit stream, the receiver 102 can extract the syndrome 480 as shown in FIG. 3. In another example, if there are multiple locations of ones in the resulting bit stream, the receiver 102 can extract multiple syndromes corresponding to the multiple locations of ones.

In one embodiment, after receiving the LRCP 241, the receiver 102 can perform CRC to determine whether the LRCP 241 is correct. Because the LRCP 241 is not correct, the CRC check generates a non-zero CRC syndrome or a remainder of the LRCP 241, which can be stored in a memory of the receiver 102. The receiver 102 can compute bitwise XOR between the one or more extracted precomputed syndromes and the non-zero CRC syndrome of the LRCP 241. If there are multiple extracted precomputed syndromes, the receiver 102 can first compute bitwise XOR between the multiple syndromes to generate a permutation syndrome and then compute bitwise XOR between the permutation syndrome and the non-zero CRC syndrome of the LRCP 241. If the resulting bit stream includes all zeros, the receiver 102 can determine that the MDP 243 is correct. If the resulting bit stream includes one or more ones, the receiver 102 can determine that the MDP 243 is incorrect with one or more bit errors. In one example, the MDP 243 is incorrect only if a bit error occurred at the same bit location multiple times and outnumbers the times the bit at the bit location was received correctly. This situation may be rare and increasingly rare as the number of retransmissions increases.

In one embodiment, if the receiver 102 determines that the MDP 243 is incorrect, the receiver 102 can perform CRC error correction to correct the one or more bit errors in the MDP. The receiver 102 can identify bit locations in the MDP 243 with low confidence level based on the soft bits in the accumulated packet 242. In one example, if a soft bit at a bit location in the accumulated packet 242 indicates that the correct bit may be either 1 or 0, this bit location can be identified as a bit location with low confidence level. For example, in the accumulated packet 242, the soft bit 2421 has a value of 2, which indicates that the bit 2431 in the MDP 243 can be either 1 or 0. Thus, the bit location of the bit 2431 in the MDP 243 is a bit location with low confidence level.

In one embodiment, for a number of N total transmissions (1 original transmission+(N−1) retransmissions), when N is an even number, the bit locations with low confidence level can be those bit locations with a soft value of $$\frac{N}{2}.$$

When N is an odd number, the bit locations with low confidence level can be those bit locations with a soft value of $$\frac{N+1}{2} \text{ and/or } \frac{N-1}{2}.$$

After one or more bit locations with low confidence level in the MDP such as the MDP 243 are identified, the receiver 102 can extract one or more precomputed syndromes corresponding to the one or more bit locations with low confidence level from the CRC syndrome table such as the table 300. For example, if the bit location with low confidence level is the last bit in the MDP 243, the receiver 102 can extract the syndrome 1 as shown in FIG. 3.

In one embodiment, the receiver 102 can compute bitwise XOR between the one or more precomputed syndromes and the non-zero CRC syndrome of the LRCP 241. If multiple precomputed syndromes are extracted, the receiver 102 can first compute bitwise XOR between the multiple precomputed syndromes to generate a permutation syndrome and then compute bitwise XOR between the permutation syndrome and the non-zero CRC syndrome of the LRCP 241. If the resulting bit stream includes all zeros, the receiver 102 can determine that the one or more bits at the one or more bit locations with low confidence level in the MDP 243 are incorrect. The receiver 102 can flip the one or more bits at the one or more bit locations with low confidence level in the MDP 243 to correct the one or more bit errors. On the other hand, if the resulting bit stream is a non-zero bit stream including one or more ones, the receiver 102 can determine that there are one or more bit locations with bit errors in the MDP 243 that are not identified by the receiver 102 based on the soft bits in the accumulated packet 242. In this situation, the CRC error correction may not correct the bit errors at the unidentified bit locations in the MDP 243. Thus, the receiver 102 can request an additional retransmission of the original packet 201 and perform CRC to determine if the additional retransmission is correct. If not, the receiver 102 can generate a new accumulated packet based on the additional retransmission and the previous retransmissions to generate a new MDP as the best guess of the original packet 201, similarly as described above.

Figure 4A:
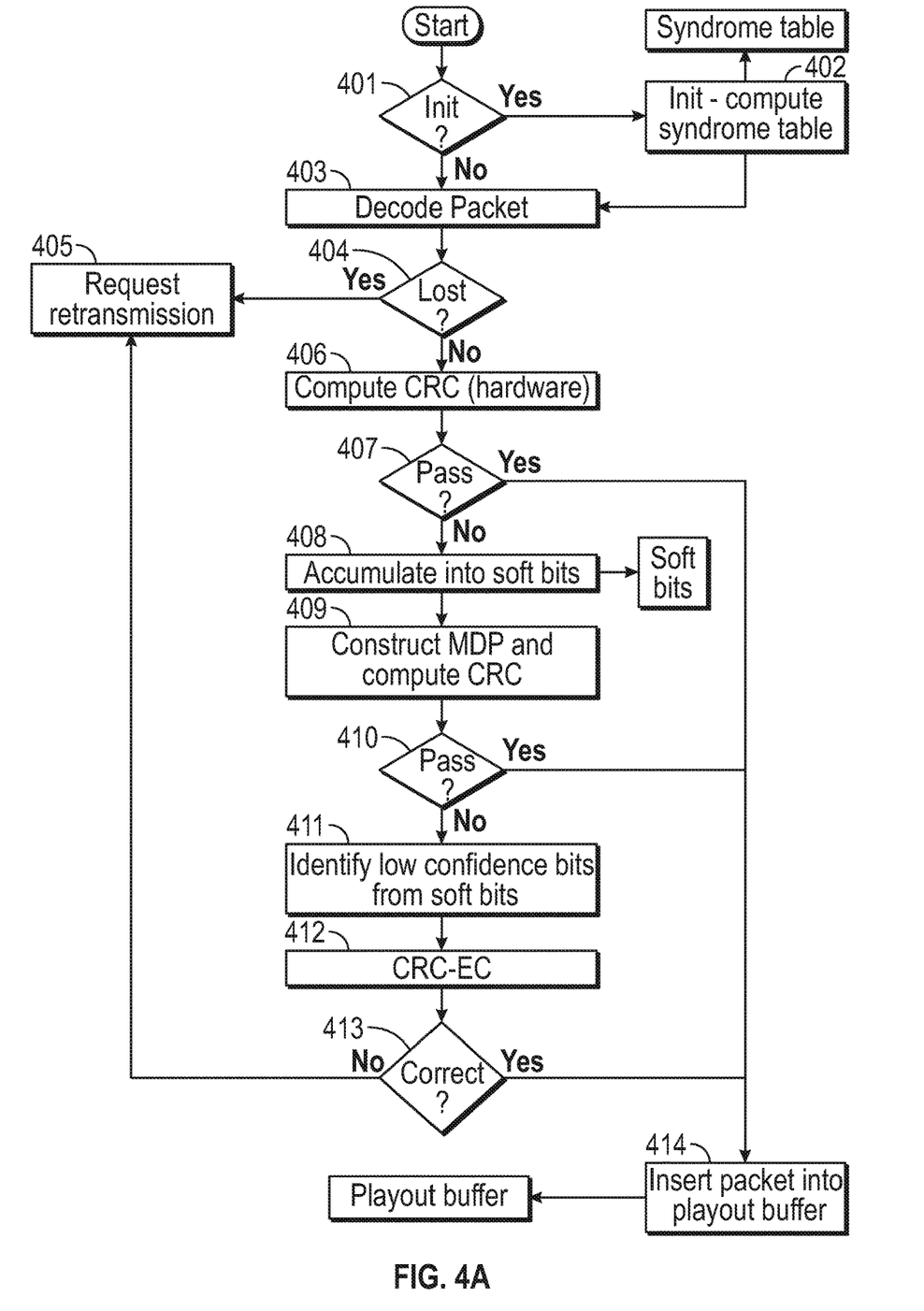
FIG. 4A illustrates a flow diagram of a method of bit error correction, in accordance with some embodiments of the present disclosure.

FIG. 4A is a flow diagram of a method 400 of bit error correction, in accordance with some embodiments of the present disclosure. Method 400 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 400 may be performed by the receiver 102, or a processing device included in the receiver 102 (e.g., processing device 502 illustrated in FIG. 5).

The method 400 begins at block 401, where the method 400 determines whether an initialization process is performed for the wireless link between the transmitter 101 and the receiver 102. If the answer at block 401 is "YES," the method 400 proceeds to block 402, where the method 400 computes and generates a CRC syndrome table (e.g., the table 300). If the answer at block 401 is "NO," the method 400 proceeds to block 403 where the method 400 performs decoding of an original transmitted packet (e.g., the packet 201). The method 400 proceeds to block 404 to determine whether the original packet is lost, e.g., whether the receiver 102 does not receive the packet 211 through the wireless link. If the answer at block 404 is "YES", the method 400 proceeds to block 405 to request the transmitter 101 to retransmit the original packet. If the answer at block 404 is "NO", the method 400 proceeds to block 406.

At block 406, the method 400 computes CRC to the received packet (e.g., the packet 211) to determine whether the received packet is the correct original packet. At block 407, the method 400 determines if the CRC is passed. If the answer at block 407 is "YES" indicating that the received packet is correct, the method 400 proceeds to block 414 to insert the received packet into playout buffer. If the answer at block 407 is "NO" indicating that the received packet is incorrect, the method 400 proceeds to block 408. At block 408, the method 400 can generate an accumulated packet including soft bits, as described above. The method 400 proceeds to block 409 to construct the MDP based on the accumulated packet and compute CRC to verify whether the MDP is correct, e.g., using a LRCP and a stored CRC syndrome table, as described above. The method 400 proceeds to block 410 to determine whether the MDP is correct.

If the answer at block 410 is "YES" indicating that the MDP is correct, the method 400 proceeds to block 414. If the answer at block 410 is "NO" indicating that the MDP is incorrect, the method 400 proceeds to block 411 to identify bits or bit locations with low confidence based on the soft bits in the accumulated packet, as described above. The method 400 then proceeds to block 412 to perform CRC error correction to the MDP, as described above. The method 400 proceeds to block 413 to determine whether the MDP is corrected by CRC error correction. If the answer at block 413 is "YES" indicating that the MDP is corrected, the method 400 proceeds to block 414. If the answer at block 413 is "NO" indicating that the MDP is not corrected which may be due to unidentified bit locations with bit errors, the method 400 proceeds to 405 to request the transmitter 101 to retransmit the original packet.

Figure 4B:
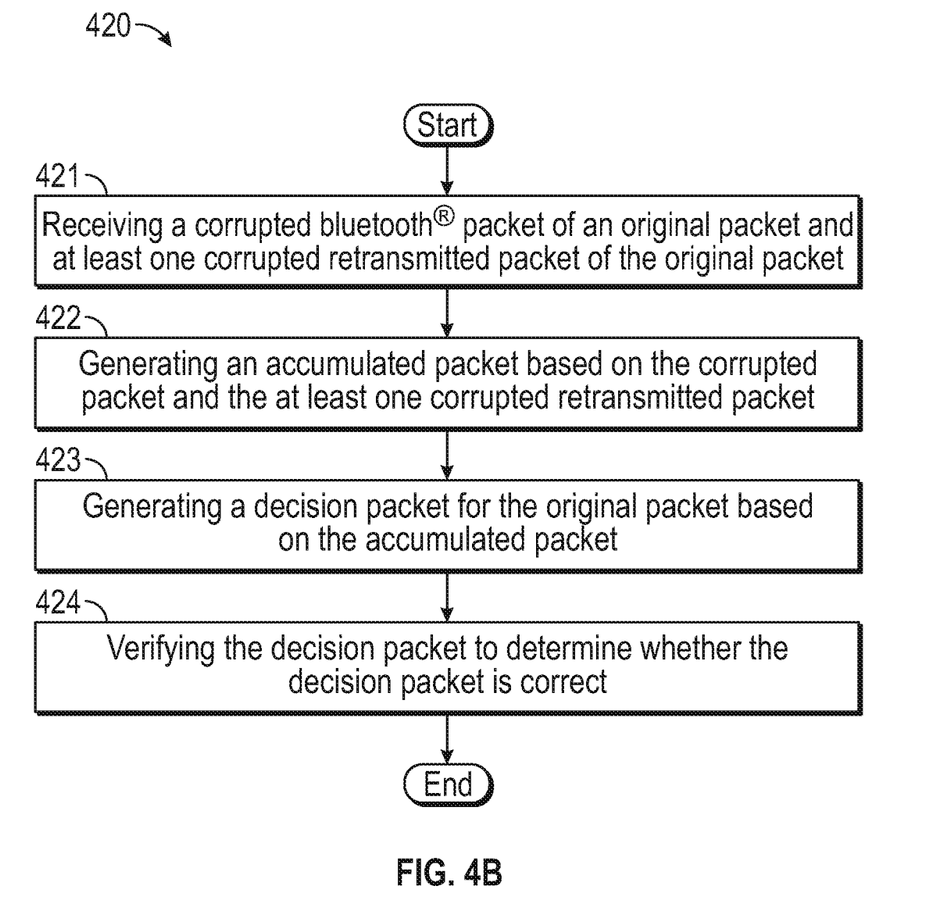
FIG. 4B illustrates a flow diagram of another method of bit error correction, in accordance with some embodiments of the present disclosure.

FIG. 4B illustrates a flow diagram of another method 420 of bit error correction, in accordance with some embodiments of the present disclosure. Method 420 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 420 may be performed by the receiver 102, or a processing device included in the receiver 102 (e.g., processing device 502 illustrated in FIG. 5).

The method 420 begins at block 421, where the method 420 comprises receiving a corrupted Bluetooth® packet of an original packet and at least one retransmitted packet of the original packet. At block 422, the method 420 comprises generating an accumulated packet based on the corrupted packet and the at least one retransmitted packet. At block 423, the method 420 comprises generating a decision packet for the original packet based on the accumulated packet. At block 424, the method 420 comprises verifying the decision packet to determine whether the decision packet is correct.

Figure 5:
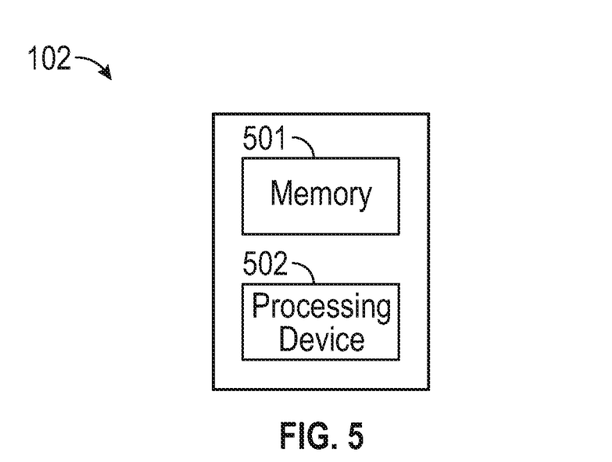
FIG. 5 is a block diagram of an example receiver that may perform one or more of the operations described herein, in accordance with some embodiments of the present disclosure.

FIG. 5 is a block diagram of an example receiver 102 that may perform one or more of the operations described herein, in accordance with some embodiments. In one embodiment, the receiver 102 includes a memory 501 and a processing device 502. The memory 501 may be synchronous dynamic random access memory (DRAM), read-only memory (ROM)), or other types of memory, which may be configured to store the generated accumulated packets and the CRC syndrome table, as described above. The processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

In other embodiments, the receiver 102 may also include other components and/or devices not shown in FIG. 5. For example, the receiver 102 may also include one or more antennas, analog-to-digital converter, demodulator/decoder and/or other components.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A receiver, comprising:
    a processing device;
    a memory;
    a non-transient computer readable medium including program instructions that in response to execution by the processing device, causes the processing device to:
        receive a corrupted packet of an original packet and store the corrupted packet in the memory; and
        receive at least one corrupted retransmitted packet of the original packet and store the at least one corrupted retransmitted packet in the memory;
        generate an accumulated packet based on the corrupted packet and the at least one corrupted retransmitted packet, the accumulated packet accumulating identical bits of the original packet received through the corrupted packet and the at least one corrupted retransmitted packet;
        generate a decision packet for the original packet based on the accumulated packet; and
        verify the decision packet to determine whether the decision packet is correct based on a last one of the at least one corrupted retransmitted packet and a cyclic redundancy check (CRC) syndrome table of syndromes for a plurality of bit streams of a single bit error.

2. The receiver of claim 1, wherein to generate the accumulated packet, the processing device is further configured to:
    perform bitwise decimal addition on the corrupted packet and the at least one corrupted retransmitted packet to generate soft bits in the accumulated packet.

3. The receiver of claim 2, wherein each of the soft bits in the accumulated packet indicates a confidence level of a corresponding bit in the decision packet.

4. The receiver of claim 1, wherein the at least one corrupted retransmitted packet includes a plurality of corrupted retransmitted packets, and wherein to verify the decision packet, the processing device is further configured to:
    verify the decision packet using a last one of the plurality of corrupted retransmitted packets and a cyclic redundancy check (CRC) syndrome of the last one of the plurality of corrupted retransmitted packets.

5. The receiver of claim 1, wherein the processing device is further configured to:
    correct the decision packet in response to determining that the decision packet is incorrect.

6. The receiver of claim 5, wherein to correct the decision packet, the processing device is further configured to:
    identify a location of at least one erroneous bit in the decision packet based on the accumulated packet.

7. The receiver of claim 6, wherein to correct the decision packet, the processing device is further configured to:
    correct the decision packet using CRC error correction.

8. A method, comprising:
    receiving a corrupted packet of an original packet and at least one corrupted retransmitted packet of the original packet;
    generating an accumulated packet based on the corrupted packet and the at least one corrupted retransmitted packet, the accumulated packet accumulating identical bits of the original packet received through the corrupted packet and the at least one corrupted retransmitted packet;

generating a decision packet for the original packet based on the accumulated packet; and verifying the decision packet to determine whether the decision packet is correct based on a last one of the at least one corrupted retransmitted packet and a cyclic redundancy check (CRC) syndrome table of syndromes for a plurality of bit streams of a single bit error.

9. The method of claim 8, wherein generating the accumulated packet comprises:

performing bitwise decimal addition on the corrupted packet and the at least one corrupted retransmitted packet to generate soft bits in the accumulated packet.

10. The method of claim 9, wherein each of the soft bits in the accumulated packet indicates a confidence level of a corresponding bit in the decision packet.

11. The method of claim 8, wherein the at least one corrupted retransmitted packet includes a plurality of corrupted retransmitted packets, and wherein verifying the decision packet comprises:

verifying the decision packet using a last one of the plurality of corrupted retransmitted packets and a cyclic redundancy check (CRC) syndrome of the last one of the plurality of corrupted retransmitted packets.

12. The method of claim 8, further comprising:

correcting the decision packet in response to determining that the decision packet is incorrect.

13. The method of claim 12, wherein correcting the decision packet comprises:

identifying a location of at least one erroneous bit in the decision packet based on the accumulated packet.

14. The method of claim 13, wherein correcting the decision packet comprises:

correcting the decision packet using CRC error correction.

15. A wireless communication system, comprising:

a transmitter configured to transmit an original packet; and a receiver, comprising:
 a processing device configured to:
  receive a corrupted packet of the original packet and at least one corrupted retransmitted packet of the original packet;
  generate an accumulated packet based on the corrupted packet and the at least one corrupted retransmitted packet, the accumulated packet accumulating identical bits of the original packet received through the corrupted packet and the at least one corrupted retransmitted packet;
  generate a decision packet for the original packet based on the accumulated packet; and
  verify the decision packet to determine whether the decision packet is correct based on a last one of the at least one corrupted retransmitted packet and a cyclic redundancy check (CRC) syndrome table of syndromes for a plurality of bit streams of a single bit error.

16. The system of claim 15, wherein to generate the accumulated packet, the processing device is further configured to:

perform bitwise decimal addition on the corrupted packet and the at least one corrupted retransmitted packet to generate soft bits in the accumulated packet.

17. The system of claim 16, wherein each of the soft bits in the accumulated packet indicates a confidence level of a corresponding bit in the decision packet.

18. The system of claim 15, wherein the at least one corrupted retransmitted packet includes a plurality of corrupted retransmitted packets, and wherein to verify the decision packet, the processing device is further configured to:

verify the decision packet using a last one of the plurality of corrupted retransmitted packets and a cyclic redundancy check (CRC) syndrome of the last one of the plurality of corrupted retransmitted packets.

19. The system of claim 15, wherein the processing device is further configured to:

correct the decision packet in response to determining that the decision packet is incorrect.

20. The system of claim 19, wherein to correct the decision packet, the processing device is further configured to:

identify a location of at least one erroneous bit in the decision packet based on the accumulated packet.

* * * * *